(12) United States Patent
Pan et al.

(10) Patent No.: US 8,245,592 B2
(45) Date of Patent: Aug. 21, 2012

(54) MANIPULATOR

(75) Inventors: Xiao-Peng Pan, Shenzhen (CN);
Zhen-Xing Liu, Shenzhen (CN);
Jun-Hai Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 259 days.

(21) Appl. No.: 12/507,919

(22) Filed: Jul. 23, 2009

(65) Prior Publication Data

US 2010/0175495 A1   Jul. 15, 2010

(30) Foreign Application Priority Data

Jan. 9, 2009   (CN) .......................... 2009 1 0300128

(51) Int. Cl.
*B25J 18/00* (2006.01)
*F16C 1/10* (2006.01)
*F16C 1/26* (2006.01)
*F16B 37/14* (2006.01)
*A47G 3/00* (2006.01)

(52) U.S. Cl. .................. 74/490.02; 74/502.4; 74/502.6; 411/372.5; 411/373; 901/27

(58) Field of Classification Search ............... 74/490.01, 74/490.02, 490.05, 490.06, 502.4, 502.6; 901/27, 29, 15; 411/372.5, 373, 374; 414/918; 248/49

See application file for complete search history.

(56) References Cited

U.S. PATENT DOCUMENTS

| 1,587,976 | A |   | 6/1926  | Moore |
| 3,776,403 | A | * | 12/1973 | Billings ........................ 414/692 |
| 4,499,341 | A | * | 2/1985  | Boyd ........................... 191/12.4 |
| 5,653,564 | A | * | 8/1997  | Nakamura ..................... 411/373 |
| 6,125,715 | A | * | 10/2000 | Nissfolk et al. ............. 74/490.02 |
| 6,530,742 | B2 | * | 3/2003  | Trinler et al. ................. 414/718 |
| 6,696,810 | B2 | * | 2/2004  | Uematsu et al. .......... 318/568.21 |
| 6,811,124 | B2 | * | 11/2004 | Karlinger ......................... 248/49 |
| 7,040,581 | B2 | * | 5/2006  | Noelke et al. ................... 248/75 |
| 7,574,942 | B2 | * | 8/2009  | Miyazaki ..................... 74/500.5 |
| 7,806,019 | B2 | * | 10/2010 | Iwai et al. .................. 74/490.02 |
| 2005/0193854 | A1 | * | 9/2005 | Sanemasa .................. 74/490.02 |
| 2009/0095110 | A1 | * | 4/2009 | Day et al. ................... 74/490.02 |

FOREIGN PATENT DOCUMENTS

| CN | 1533321   | A | 9/2004 |
| TW | 200404654 | A | 4/2004 |

* cited by examiner

*Primary Examiner* — Justin Krause
*Assistant Examiner* — Adam D Rogers
(74) *Attorney, Agent, or Firm* — Altis Law Group, Inc.

(57) ABSTRACT

A manipulator includes an arm body, a cable, and at least one cover fixed on the arm body. The arm body has at least one friction portion over which the at least one cover covers. The at least one cover separates the cable from contacting with the friction portion, thus protects the cable from being damaged by the friction portion.

14 Claims, 3 Drawing Sheets

MANIPULATOR

BACKGROUND

1. Technical Field

The present disclosure generally relates to a robot and, particularly, to a manipulator applied in a robot.

2. Description of Related Art

Manipulators are used for performing dangerous work and have a high efficiency, thus more and more manipulators are applied in manufacturing industries.

Manipulators are usually driven by electric power through cables fixed thereon, and define openings for the cables to run therethrough.

However, the portion adjacent to the openings of the manipulators are usually rough, or even fixed with screws. When the manipulators are moving, the cables may be damaged by the portion adjacent to the openings or the screws. In addition, the cables may be entangled with the screws or other components thereby causing inconvenience during production.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
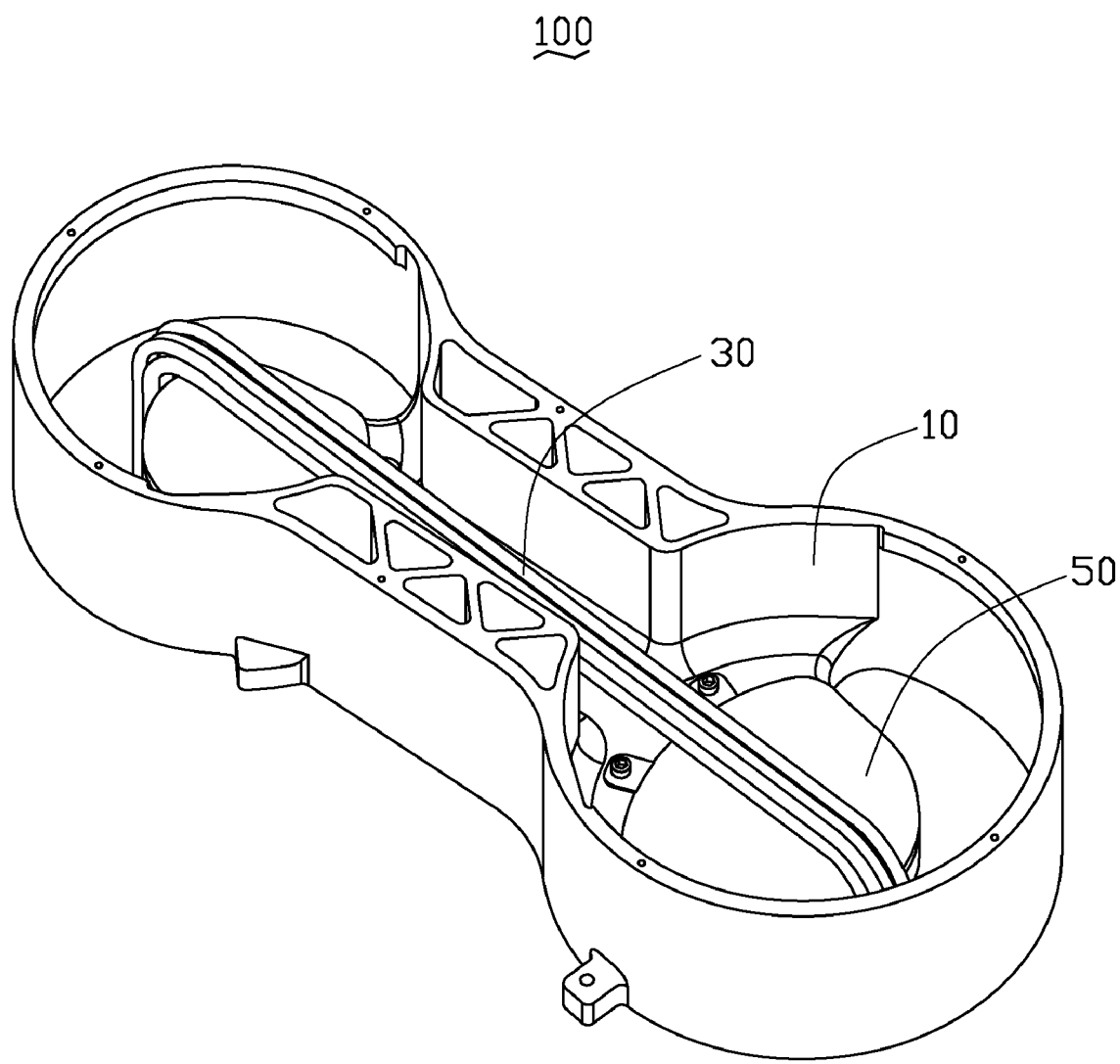
FIG. 1 is an assembled, isometric view of an embodiment of a manipulator.

Referring to FIG. 1, a manipulator 100 of the illustrated exemplary embodiment includes an arm body 10, a sheaf of cables 30, and two covers 50 fixed in the arm body 10.

Figure 2:
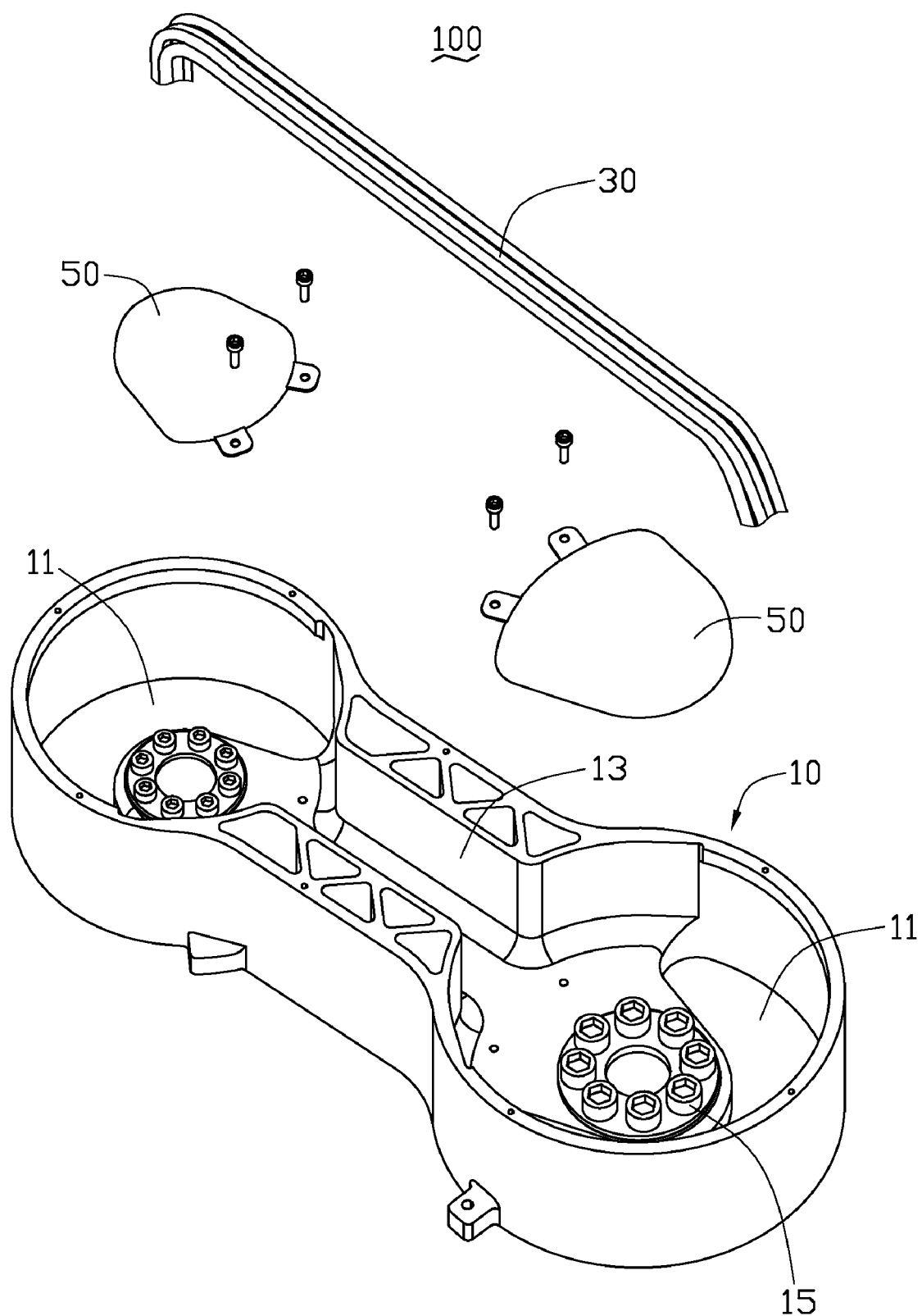
FIG. 2 is an exploded, isometric view of the manipulator of FIG. 1.

Also referring to FIG. 2, the arm body 10 defines two openings 11 at two ends thereof, and a guiding groove 13 in which the cables 30 are partially received. The arm body 10 further includes a plurality of screws 15 fixed thereon, adjacent to and between the two openings 11. The screws 15 form two friction portions on the arm body 10 adjacent to the openings 11. The openings 11 may be arc-shaped, depending on the shape of the manipulator 100. The guiding groove 13 communicates with the openings 11 and is defined between the openings 11.

The cables 30 are electric cables to transmit electric power. The cables 30 run though one opening 11 and pass the guiding groove 13 to run through the other opening 11.

Figure 3:
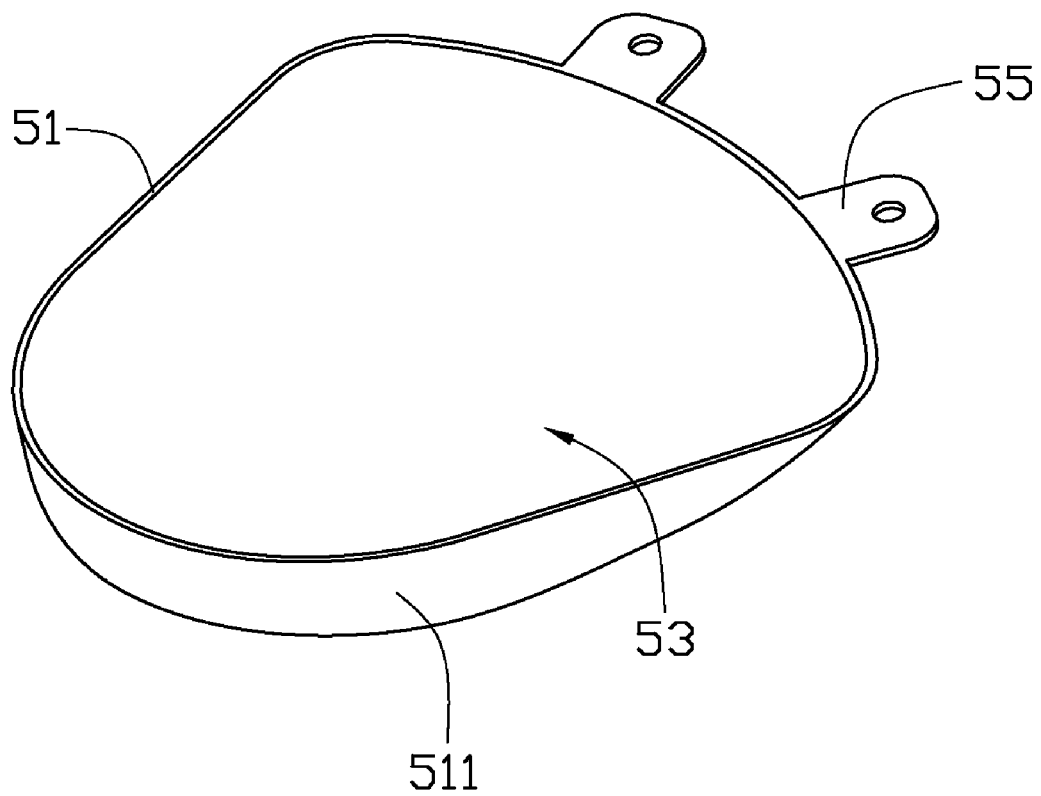
FIG. 3 is an isometric view of a cover of the manipulator in FIG. 1, but viewed from another aspect.

Referring to FIG. 2 and FIG. 3, each of the covers 50 includes a cover body 51, a receptacle 53 encircled by the cover body 51, and a plurality of connecting portions 55 extending from an edge of the cover body 51. The cover body 51 has a smooth outer surface 511. In the illustrated embodiment, each cover 50 includes two connecting portions 55.

In the manipulator 100, the covers 50 cover the screws 15, and the connecting portions 55 are away from the openings 11. The two covers 50 are fixed on the arm body 10 by a plurality of screws smaller than the screws 15. The cables 30 pass over the covers 50 and may contact the outer surface 511 of each cover 50, to avoid contact the screws 15.

The covers 50 separate the cables 30 from contacting friction portions, such as the screws 15. Therefore, the cables 30 may be protected from damage by the screws 15. In addition, the cables 30 will retain its shielding, thus preventing arcing and ensuring safety for operators. Furthermore, the cables 30 may not be entangled with the screws 15 so as to prevent any inconvenience during production. The outer surface 511 of the covers 50 are smooth, so the cables 30 may have a long lifespan. Moreover, since the connecting portions 55 are away from each opening 11, the cables 30 may not be damaged by the connecting portions 55.

In alternative embodiments, the screws 15 may be other connecting members, such as pins, rivet, etc. The number of the openings 11 of the arm body 10 may not be limited to two, instead, for example, one or more than two. Correspondingly, the number of the covers 50 adjacent to the opening 11 would be the same. The number of the cables 30 may also be only one or multi-sheaves.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A manipulator, comprising:
   an arm body which has at least one friction portion thereon, and the at least one friction portion comprising a plurality of screws;
   at least one opening defined in the arm body and adjacent to the at least one friction portion;
   a cable positioned on the arm body, the cable adjacent to the at least one friction portion; and
   at least one cover comprising a cover body having an outer surface and a receptacle encircled by the cover body, the at least one cover being fixed to the arm body covering the at least one friction portion, wherein the cable passes over the at least one cover and extends through the at least one opening, and the cable is only contacting the outer surface of the cover.

2. The manipulator of claim 1, wherein the at least one cover further comprises at least one connecting portion extending from an edge of the cover body; and the at least one cover is fixed on the arm body through the at least one connecting portion.

3. The manipulator of claim 2, wherein the outer surface of the at least one cover is smooth.

4. The manipulator of claim 1, wherein at least one connecting portion extends away from the at least one opening.

5. The manipulator of claim 4, further comprising at least one screw to connect the at least one connecting portion to the arm body.

6. The manipulator of claim 1, wherein the arm body further defines a guiding groove communicating with the at least one opening, and the cable is received in the guiding groove.

7. The manipulator of claim 1, wherein the at least one friction portion is at least one connecting member fixed on the arm body.

8. The manipulator of claim 1, wherein the at least one opening is defined in an end of the arm body and penetrates through the arm body.

9. A manipulator, comprising:
   an arm body which has at least one friction portion thereon, and the at least one friction portion comprising a plurality of screws;

at least one opening defined in the arm body and adjacent to the at least one friction portion;

a cable positioned on the arm body; and at least one cover fixed on the arm body, and the at least one cover comprising a cover body having an outer surface and a receptacle encircled by the cover body;

wherein the at least one cover covers the at least one friction portion and separates the cable from contacting the at least one friction portion; the cable passes over the at least one cover and extends through the at least one opening.

10. The manipulator of claim 9, wherein the at least one cover further comprises at least one connecting portion by which the at least one cover is fixed on the arm body.

11. The manipulator of claim 10, wherein the at least one connecting portion is formed on a side of the at least one cover away from the at least one opening.

12. The manipulator of claim 9, wherein the arm body further defines a guiding groove communicating with the at least one opening, and the cable is received in the guiding groove.

13. The manipulator of claim 9, wherein the at least one friction portion is a connecting member fixed on the arm body.

14. The manipulator of claim 9, wherein the at least one opening is defined in an end of the arm body and penetrates through the arm body.

* * * * *